United States Patent [19]
Bohner et al.

[11] Patent Number: 6,138,788
[45] Date of Patent: Oct. 31, 2000

[54] VEHICLE STEERING SYSTEM

[75] Inventors: Hubert Bohner, Boeblingen; Martin Moser, Fellbach, both of Germany

[73] Assignee: DaimlerChrysler AG, Stuttgart, Germany

[21] Appl. No.: 09/208,989

[22] Filed: Dec. 11, 1998

[30] Foreign Application Priority Data

Dec. 11, 1997 [DE] Germany ............... 197 55 044

[51] Int. Cl.$^7$ ...................................... B62D 5/00
[52] U.S. Cl. ..................... 180/405; 180/402; 180/403
[58] Field of Search ................... 180/402, 403, 180/404, 405, 406, 407

[56] References Cited

U.S. PATENT DOCUMENTS

| | | | |
|---|---|---|---|
| 3,580,352 | 5/1971 | Hestad | 180/79.2 |
| 3,734,226 | 5/1973 | MacDuff | 180/79.2 R |
| 4,004,537 | 1/1977 | Nilsson | 114/144 R |
| 4,660,671 | 4/1987 | Behr et al. | 180/142 |
| 4,860,844 | 8/1989 | O'Neil | 180/79.1 |
| 4,898,258 | 2/1990 | Ohe et al. | 180/79.1 |
| 4,940,105 | 7/1990 | Matsunaga et al. | 180/133 |
| 5,135,069 | 8/1992 | Hattori et al. | 180/142 |
| 5,201,180 | 4/1993 | Callahan | 180/132 |
| 5,247,441 | 9/1993 | Serizawa et al. | 364/424.05 |
| 5,275,250 | 1/1994 | Muller et al. | 180/79 |
| 5,845,736 | 12/1998 | Bohner et al. | 180/403 |
| 5,862,878 | 1/1999 | Bohner et al. | 180/403 |
| 5,953,978 | 9/1999 | Bohner et al. | 91/363 A |

FOREIGN PATENT DOCUMENTS

| | | |
|---|---|---|
| 0 539 823 A1 | 5/1993 | European Pat. Off. . |
| 32 40 629 C2 | 11/1982 | Germany . |
| 39 18 987 A1 | 6/1989 | Germany . |
| 195 40 956 C1 | 11/1995 | Germany . |
| 61-291268 | 12/1986 | Japan . |
| 2273477 | 6/1994 | United Kingdom . |
| 2 290 511 | 1/1996 | United Kingdom . |
| 2 309 675 | 8/1997 | United Kingdom . |
| 2 310 177 | 8/1997 | United Kingdom . |
| 2 320 003 | 6/1998 | United Kingdom . |
| 2339178 | 1/2000 | United Kingdom . |
| WO 97/17247 | 5/1997 | WIPO . |

*Primary Examiner*—Brian L. Johnson
*Assistant Examiner*—Daniel Yeagley
*Attorney, Agent, or Firm*—Evenson, McKeown, Edwards & Lenahan, P.L.L.C.

[57] ABSTRACT

A vehicle steering system has a steering handle as well as steered vehicle wheels connected with one another with respect to the effect at least in the normal operation only by way of a control device ("steer by wire") which compares the signals of a steering angle actual value generator operated by the vehicle wheels and of a steering angle desired value generator operated by the handle. The control device controls a motor used as a manual force adjuster which is coupled with the handle by way of a torsionally elastic shaft arrangement. The extent of the torsionally elastic deformation is analyzed for determining the actual value of the manual force.

19 Claims, 5 Drawing Sheets

VEHICLE STEERING SYSTEM

BACKGROUND OF THE INVENTION

This application claims the priority of German application 197 55 044.4, filed Dec. 11, 1997, the disclosure of which is expressly incorporated by reference herein.

The present invention relates to a vehicle steering system, having a steering handle operated by the driver, particularly a manual steering wheel, as well as a motor-driven adjusting assembly which is assigned to the steered vehicle wheels and with which the steering handle is connected with respect to the effect by way of a control system whose controlling device arrangement is connected on the input side to a desired value generator for a steering angle to be set operated by the steering handle as well as to an actual value generator which records the steering angle of the vehicle wheels. By way of the system's output, the adjusting assembly is controlled as a function of a comparison of the desired and the actual value, as well as having a manual force adjuster connected with respect to the drive with the steering handle. The manual force adjuster simulates a parameter-dependent steering resistance on the handle. The steering handle and a servo motor provided as the manual force adjuster are connected with respect to the drive by way of a shaft. A controlling device controls the servo motor as a function of a comparison of the actual value signal and a signal of a desired-value generator.

Current passenger cars and the like are as a rule equipped with hydraulic power steering systems, in which a manual steering wheel is mechanically forcibly coupled with the steerable vehicle wheels. The steerable vehicle wheel is also coupled with respect to the drive to a servo motor which is controlled as a function of the forces and moments transmitted between the manual steering wheel and the steered vehicle wheels, specifically such that the manual force required for the respective steering maneuver on the steering handle is more or less clearly reduced. For controlling the servo motor, as a rule, parts of the mechanical driving connection between the manual steering wheel and the steered vehicle wheels are elastically coupled with one another so that, corresponding to the respective effective forces and moments, the mentioned parts carry out a more or less large stroke or a more or less large rotation relative to one another. With this stroke or by way of this relative rotation, in the case of a hydraulic servo motor, a servo valve is then operated which controls the motor. Optionally, an electric adjusting assembly used as a servo motor can also be controlled by the stroke or the relative rotation.

In airplanes, tail units and landing flaps and the like are connected with assigned handles only with respect to the effect by way of a controlling system. The handle operates a desired value generator and the landing flaps or tail units operates an actual value generator. The controlling device of the controlling system processes the signals of the desired value generator and of the actual value generator in the sense of a desired value—actual value comparison. As a function of the result of this comparison, motor-driven actuating assemblies the tail units or landing flaps are controlled. This concept, which is also called "Fly by Wire", has in the meantime become so reliable that also passenger planes are equipped correspondingly.

Comparable arrangements may basically be provided in the case of vehicle steering systems, as shown, for example, in DE 195 40 956 C1, in which a vehicle steering system is described. A special advantage of such a known arrangement is the fact that, on the one hand, virtually arbitrary steering kinematics, and particularly also an arbitrary transmission ratio between the adjusting movements of the steering handle and the steering movements of the steered vehicle wheels, can be implemented. If equipped with a corresponding sensor system, the system is easily suitable for compensating interference parameters, such as cross wind influences, in a manner to be discussed.

In above-mentioned DE 195 40 956 C1, a mechanical through-drive between the steering handle and the steered vehicle wheels is not completely eliminated. On the contrary, such a through-drive is opened up when the control system operates without fault and thus the through-drive is rendered ineffective. If, however, a malfunction is determined in the control system, which constantly monitors itself with respect to faults, the mechanical through-drive is automatically switched on to become operative, i.e., the mechanical through-drive forms an "emergency level" in the case of a possible malfunctioning of the control system. Furthermore, DE 195 40 1956 C1 describes a non-self-locking electric motor for simulating the manual force.

EP 0 539 823 A1 also shows a vehicle steering system in which the steering handle and the steered vehicle wheels are coupled by way of a controlling system.

DE 32 40 629 C2 describes a conventional vehicle steering system with a continuously effective mechanical through-drive between the manual steering wheel and the steered vehicle wheels in which the steering shaft is constructed with handle-side and steering-transmission-side shaft parts which can be rotated relative to one another against an elastic resistance. The extent and the direction of the relative rotation between these shaft parts allow a signal to be derived for controlling a power assembly. A spring arrangement in the form of a torsion bar or the like may be arranged between the mentioned shaft parts.

In a power steering system described in DE 39 18 987 A1 which has a forced mechanical coupling between the manual steering wheel and the steered vehicle wheels, the required manual force is changed by an electric motor which, in a normal case, generates a parameter-dependent reaction power at the manual steering wheel and, in special cases, can also act as a servo motor.

An object of the present invention is to provide an advantageous embodiment of a steering system in which particularly the controlling of the manual force adjuster is to be improved.

This object has been achieved in a vehicle steering system according to the present invention by providing that the shaft has handle-side and motor-side shaft parts which can be rotated relative to one another against an elastic resistance, and from the extent and the direction of the relative rotation between the shaft parts, an actual value signal can be generated for the manual force.

The present invention is based on the discovery of the general idea of providing between the steering handle and the servo motor acting as a manual force adjuster, of using a mechanical driving connection of a spring-type elasticity and of using the elastic deformations occurring during the operation as an actual value signal of the manual force for controlling the servo motor. This first results in the advantage that the actual values of the manual forces generated by the manual force adjusters can be detected by path generators or angle-of-rotation generators; i.e., the actual value determination of the manual forces can take place in a particularly simple manner with respect to measuring techniques. The advantage is obtained that similar arrangements can be used for the spring-elastic driving connection between the manual force adjuster and the steering handle, as those which were successful for controlling servo motors in conventional power steering systems; i.e., conventional mass-produced products can largely be used.

According to a particularly preferred embodiment of the present invention, it may be provided that, in the event of a malfunctioning of the controlling system between the steering handle and the steered vehicle wheels, a mechanical through-drive becomes effective, which extends via the shaft with the handle-side and motor-side shaft parts, which are rotatable with respect to one another against an elastic resistance, and is opened up during the correct functioning of the controlling system. The servo motor of the manual force adjuster operates as a servo motor which is controlled as a function of the extent and of the direction of the relative rotation of the shaft parts.

The above-mentioned shaft has a double function here in that, during the normal operation when the servo motor is used for generating a manual force, the elasticity of the shaft is used for the actual value determination of the manual force. In emergency situations, when the servo motor is to operate as a booster motor, the elasticity is to be used for controlling the servo assistance.

In this manner, a largely conventional power steering system can be made available in a constructively simple manner as an emergency plane, in which the components used for generating and controlling the servo power are used during the normal steer-by-wire operation for generating or detecting the manual force.

BRIEF DESCRIPTION OF THE DRAWINGS

These and further objects, features and advantages of the present invention will become more apparent from the following detailed description of a currently preferred embodiments when taken in conjunction with the accompanying drawings wherein.

DETAILED DESCRIPTION OF THE DRAWINGS

Figure 1:
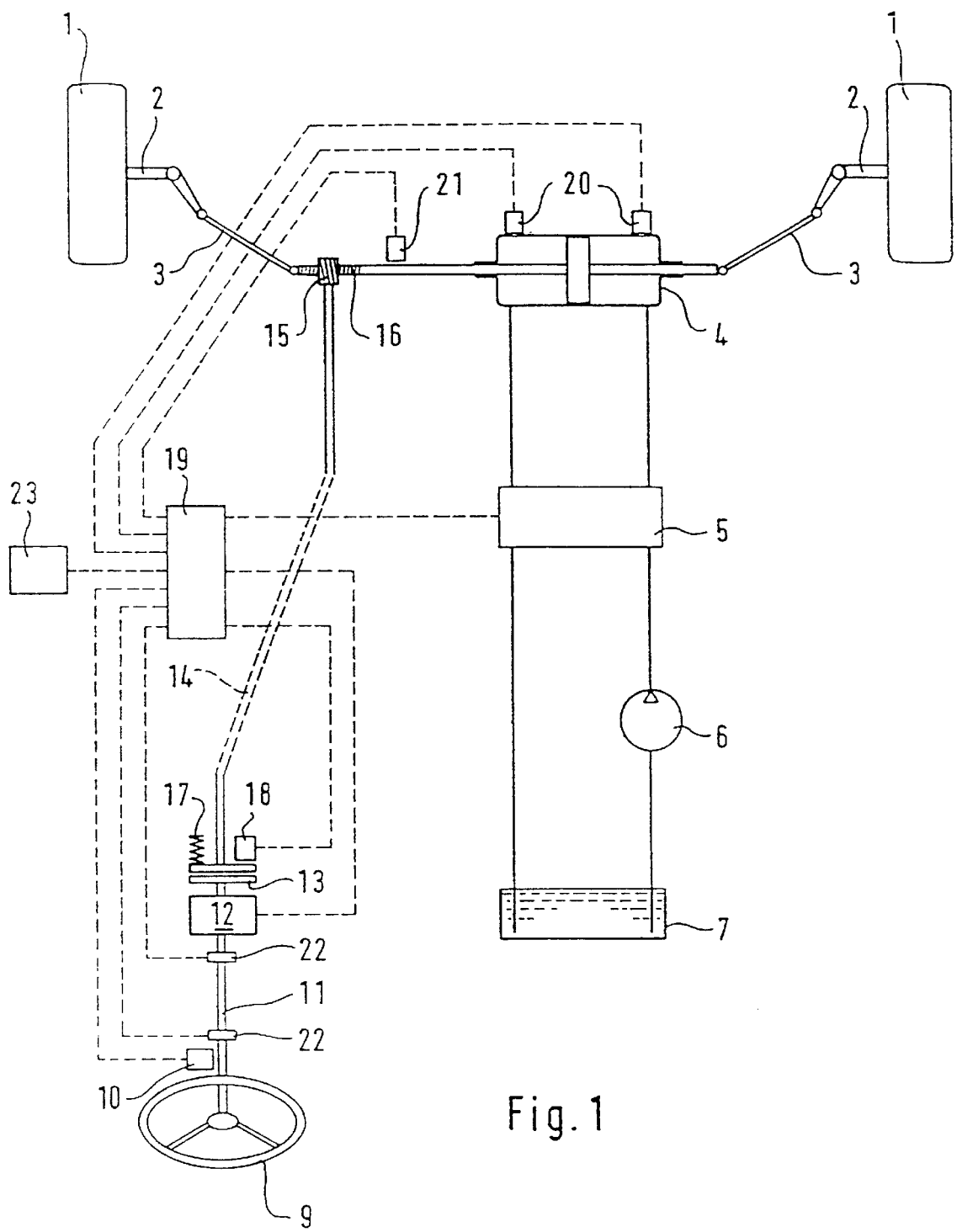
FIG. 1 is a wiring-diagram-type schematic view of the vehicle steering system according to the present invention.

According to FIG. 1, a motor vehicle has two conventional steerable front wheels 1 which are each arranged on a wheel carrier 2 which is elastically held relative to the vehicle body and which can in each case be swivelled about the vertical axis of the vehicle in order to permit the steerability of the assigned vehicle wheel 1. The wheel carriers 2 are connected by way of tie rods 3 with an adjusting assembly 4 which is, for example, hydraulic and constructed as a double-acting hydraulic piston-cylinder unit.

The two hydraulic chambers of the adjusting assembly 4, which are partitioned off from one another by the piston of the adjusting assembly 4, can be connected by an electromagnetically operable control valve 5 with the delivery side of a hydraulic pressure source, for example, a hydraulic pump 6, or with a relatively pressureless hydraulic reservoir 7, with which the suction side of the hydraulic pump 6 also communicates. According to the position of the control valve 5, the hydraulic adjusting assembly 4 can generate a controllable actuating force in one or the other direction, or change or maintain the adjusted position.

A steering handle, e.g. a wheel 9 operated by the driver controls a desired-value generator 10 whose electric output signals represent the desired value of the steering angle of the steerable vehicle wheels 1 or a quantity correlated thereto. In addition, the manual steering wheel 9 is connected with respect to the drive by a torsionally elastic shaft or shaft arrangement 11 with an electric motor 12 which is used for generating a manual force which can be felt at the manual steering wheel 9.

Furthermore, the manual steering wheel 9 is connected with respect to the drive by the shaft or shaft arrangement 11 as well as a coupling 13 and a shaft pull 14 (or another driving connection) with a steering gear part of the steerable vehicle wheels 1. In the illustrated embodiment, the shaft pull 14 leads to a pinion 15 which meshes with a toothed rack 16 adjoining the piston rod of the hydraulic adjusting assembly 4. The coupling 13 is continuously acted upon by a closing force, for example, by a closing spring 17, against which the coupling 13 can be brought into the open position or held in the open position by an electric servo motor 18.

A computer-aided controller arrangement 19 is connected on the input side with the desired value generator 10 for the steering angle as well as sensors 20 whose signals are correlated to the steering forces occurring at the steerable vehicle wheels 1. For example, the sensors 20 can detect the hydraulic pressures in the adjusting assembly 4. The pressure difference between the two chambers of the adjusting assembly 4 is a measurement of the effective steering forces which is analogous with respect to the preceding sign and the amount.

Furthermore, the controller arrangement 19 is connected on the input side with a path generator 21 which senses the adjusting stroke of a steering gear part, i.e., the piston rod of the adjusting assembly 4, and thus a quantity which is analogous to the actual value of the steering angle of the wheels 1. Two angle-of-rotation generators 22 are also connected with the input side of the controller arrangement 19, whose signals indicate the elastic torsion of the shaft or shaft arrangement 11.

Finally, the input side of the controller arrangement 19 can also be connected with sensors 23 through which parameters to be indicated, such as the vehicle lateral acceleration and/or the yaw velocity, are detected. On the output side, the controller arrangement 19 is connected with the control valve 5, the electric motor 12 and the servo motor 18.

During normal operation, i.e., when the controller arrangement 19, which continuously monitors itself with respect to a correct functioning, determines no malfunction, the servo motor 18 is controlled by the controller arrangement 19 such that it holds open the coupling 13 against a continuously operative closing force of the closing spring arrangement 17, and correspondingly no forced coupling exists between the manual steering wheel 9 and the steerable vehicle wheels 1.

As a function of the signals of the desired value generator 10, which is operated by the manual steering wheel 9, the controller arrangement 19 controls the control valve 5 such that, for the steering adjustment of the vehicle wheels 1, the adjusting assembly 4 carries out an adjusting stroke, in which the actual value of the steering angle detected by the path generator 21 is set to the desired steering angle value indicated by the desired value generator 10. Optionally, this desired value can be modified by signals of the sensors 23 in order to at least partially control disturbing forces, such as cross wind influences, affecting the vehicle.

Furthermore, the controller arrangement 19 determines from the signals of the sensors 20, which reflect the effective steering forces on the vehicle wheels 1, as well as optionally from the signals of additional sensors or signal generators, for example, those for the driving speed, a manual force which is to be felt at the manual steering wheel 9. As a function of this desired value, the electric motor 12 is controlled, in which the respective actual value of the manual force is determined from the signals of the angle-of-rotation generators 22. The difference between the angles of rotation detected by the angle-of-rotation generators 22 is a measurement of the elastic torsion of the shaft or shaft arrangement 11 and thus a measurement of the torque in effect between the manual steering wheel 9 and the electric motor 12, which is analogous to the manual force which can be felt at the manual steering wheel 9.

If, when monitoring the function, the controller arrangement 19 determines the existence of a malfunction, the operating magnets of the control valve 5 are switched into a currentless state so that the control valve 5 can be brought into a neutral position by springs or the like in which the hydraulic adjusting assembly 4 is hydraulically switched to the free-wheel operation. Furthermore, the servo motor 18 of the coupling 13 is also switched to a currentless state. As a result, the coupling 13 is closed by its closing spring arrangement 17 and thus a forced coupling is established between the manual steering wheel 9 and the steered vehicle wheels 1.

If the manual steering wheel 9 is operated now, the shaft or the shaft arrangement 11 is rotated corresponding to the forces or torques transmitted between the manual steering wheel 9 and steerable vehicle wheels 1. This permits control of the electric motor 12 as a function of these forces and torques in order to reduce the manual forces for steering maneuvers which must be applied by the driver in this operating phase. That is, the electric motor 12 now takes over the function of a servo motor. The corresponding control of the electric motor as a function of the signals of the angle-of-rotation generator 22 can take place by a separate control circuit of the controller arrangement 19 which is provided for this operating mode. This control circuit is automatically switched to be operative when the coupling 13 closes.

In addition or as an alternative, the hydraulic adjusting assembly 4 can be used as a servo motor when the coupling 13 closes. For this purpose, the control valve 5 is operated by another separate control circuit of the controller arrangement 19 as a function of the signals of the angle-of-rotation generators 22. Thereby, the adjusting assembly 4 generates an adjusting force by which the angle-of-rotation difference determined by the angle-of-rotation generators 22 is reduced.

Figure 2:
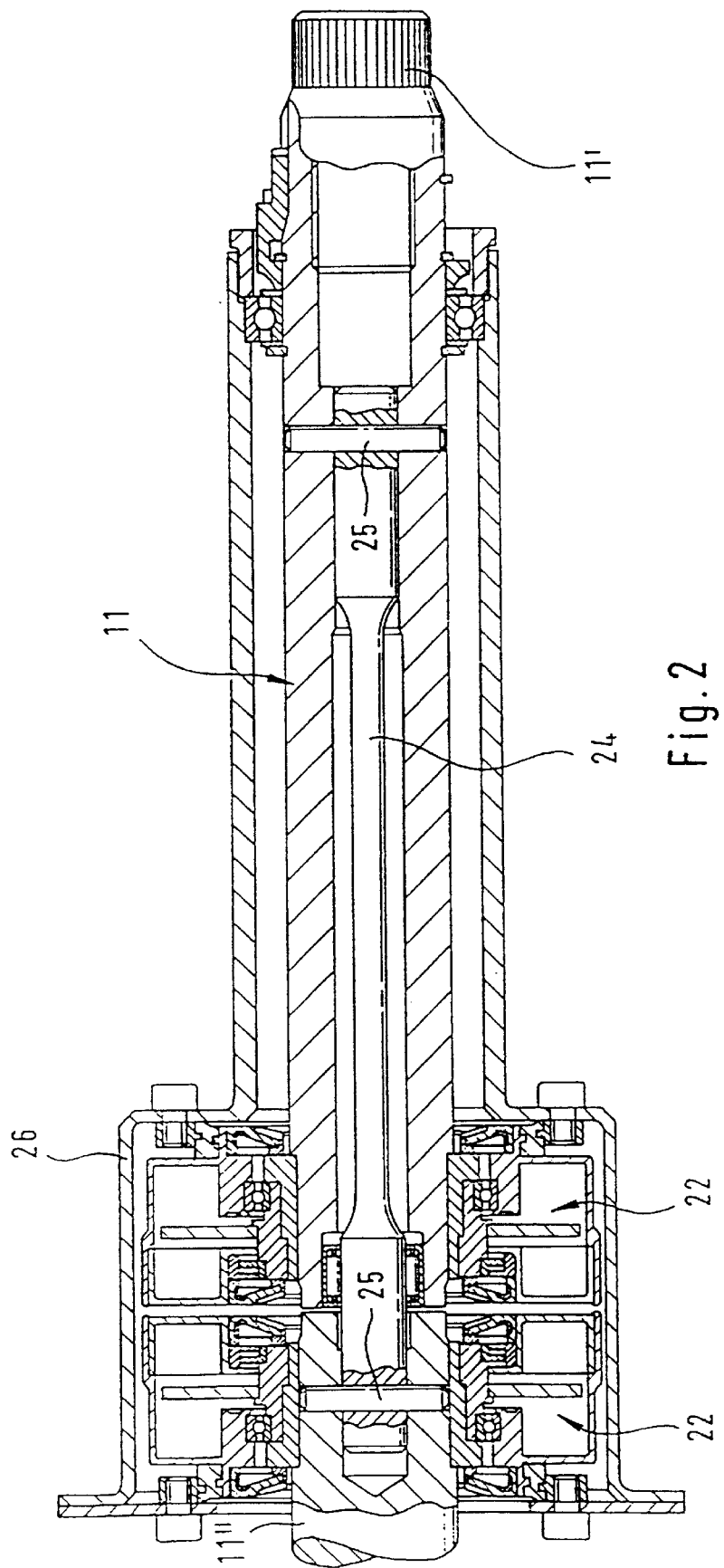
FIG. 2 is a longitudinal sectional view of a first embodiment for an elastically flexible shaft arrangement for the driving connection of a steering handle with a servo motor for generating a manual force.

FIG. 2 illustrates an advantageous embodiment of the shaft or shaft arrangement 11. A shaft part 11', which is connected with the manual steering wheel 9 (seen in FIG. 1), is torsionally elastically coupled by way of a torsion rod 24 with a shaft part 11" which, in turn, is connected with the electric motor 12 (seen in FIG. 1) or forms its motor shaft. The torsion rod 24 is housed in corresponding axial bores of the shaft parts 11', 11" and is non-rotatably connected on its axial ends by respective pins 25 with the respective shaft part 11', 11". The pins 25 penetrate respective mutually aligned cross bores in the shaft parts 11', 11" or the end pieces of the torsion rod 24. Because of the torsional elasticity of the torsion rod 24, a relative rotation occurs between the shaft parts 11', 11" during the transmission of a torque.

The direction and extent of the relative rotation depends on the direction and extent of the torque. This relative rotation is detected by the two angle-of-rotation generators 22 which are arranged on the mutually adjacent ends of the two shaft parts 11', 11" and each detect the relative rotation of the assigned shaft part 11' or 11" with respect to a stationary housing 26.

Figure 3:
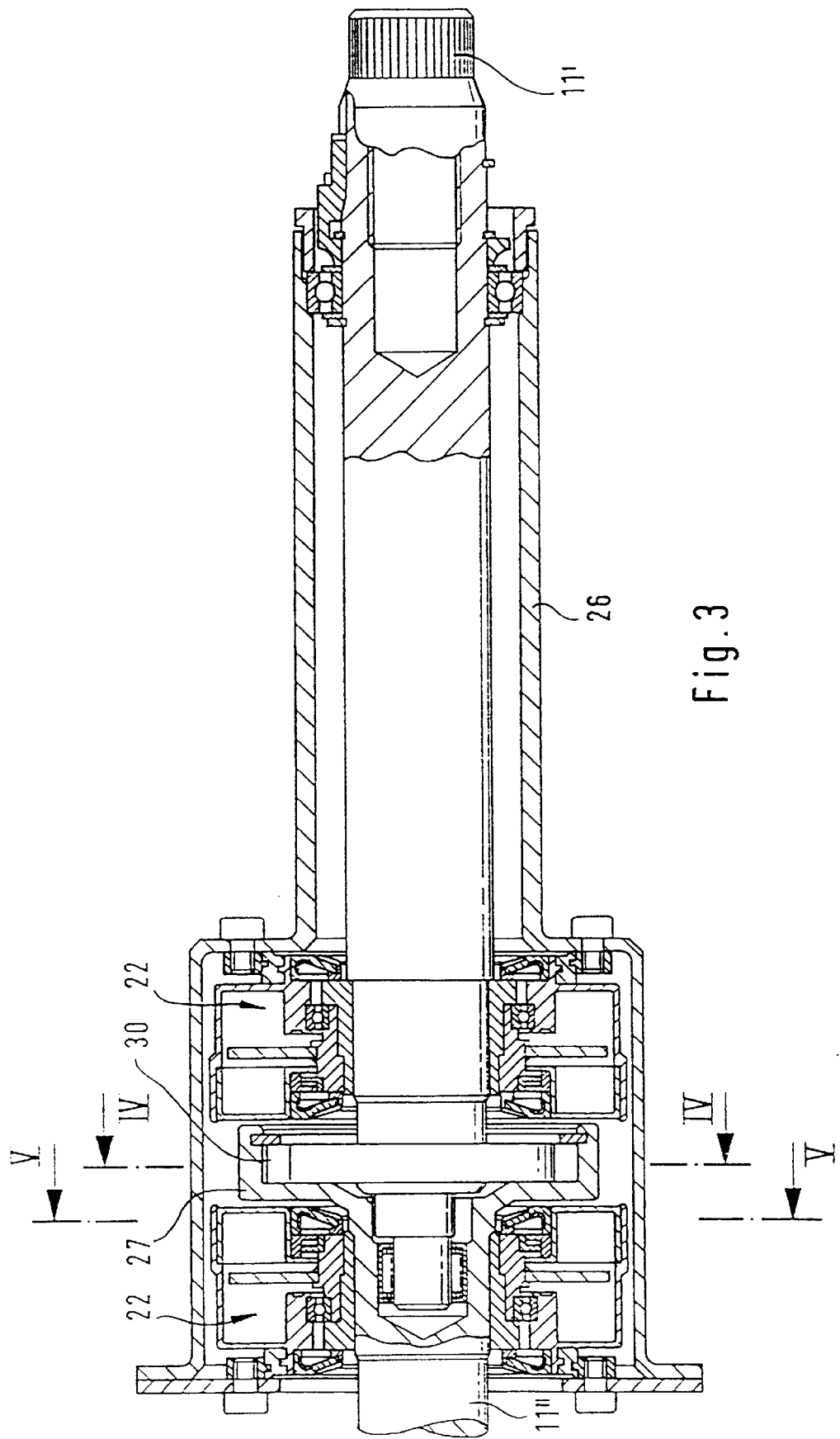
FIG. 3 is a sectional view of a modified embodiment which corresponds to FIG. 2.

The embodiment illustrated in FIG. 3 differs from the embodiment illustrated in FIG. 2 mainly by a different construction of the torsionally elastic connection of the shaft parts 11', 11". A hollow cylinder 27 is arranged on or molded to the shaft part 11" and has an axial rib 28 on its inner circumference side, as illustrated in the cross-sectional view of FIG. 4. The section of the shaft part 11' which axially penetrates the hollow cylinder 27 has a similar rib 29 on its outer circumference. In addition, this section of the shaft part 11' is enclosed by a C-spring 30 whose ends rest, in the relative center position of shaft part 11' and shaft part 11" illustrated in FIG. 4, against the flanks of both ribs 28, 29, preferably without any significant pretensioning. During relative rotations between the shaft parts 11', 11", the C-spring 30 is more or less elastically spread by the ribs 28, 29, the elastic spring tension of the C-spring 30 clearly rises progressively, i.e., during slight relative rotations of the shaft parts 11', 11", and the restoring forces generated by the C-spring 30 rise at a relatively small spring constant. During larger relative rotations of the shaft parts 11', 11", the ratio between the angle-of-rotation change and the change of the restoring force has a clearly higher value.

During the above-mentioned relative rotations of the shaft parts 11', 11", one flank respectively of the rib 28 presses against one end of the C-spring 30, while the other end of the C-spring is acted upon by the adjacent flank of the other rib 29. In order to avoid a jamming of the C-spring 30 inside the annulus between the inner circumference of the hollow cylinder and the outer circumference of the section of the shaft part 11' penetrating the hollow cylinder 27, the possible angle of rotation between the shaft parts 11', 11" can be limited by stops.

Figure 4:
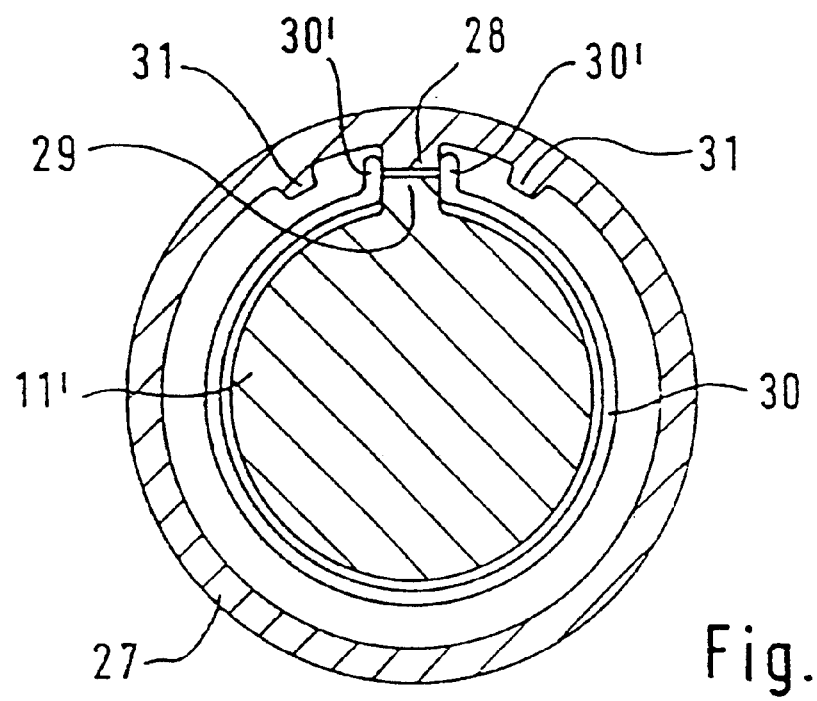
FIG. 4 is a sectional view along line IV—IV in FIG. 3.

For the foregoing limiting purpose, according to FIG. 4 for example, two additional axial ribs 31 can be provided on the inner circumference of the hollow cylinder 27. These ribs 31 interact in a stop-type manner with the flanks 30' of the ends of the C-spring 30 facing away from the ribs 28 and 29, if the shaft parts 11' and 11" are rotated sufficiently far relative to one another.

Figure 5:
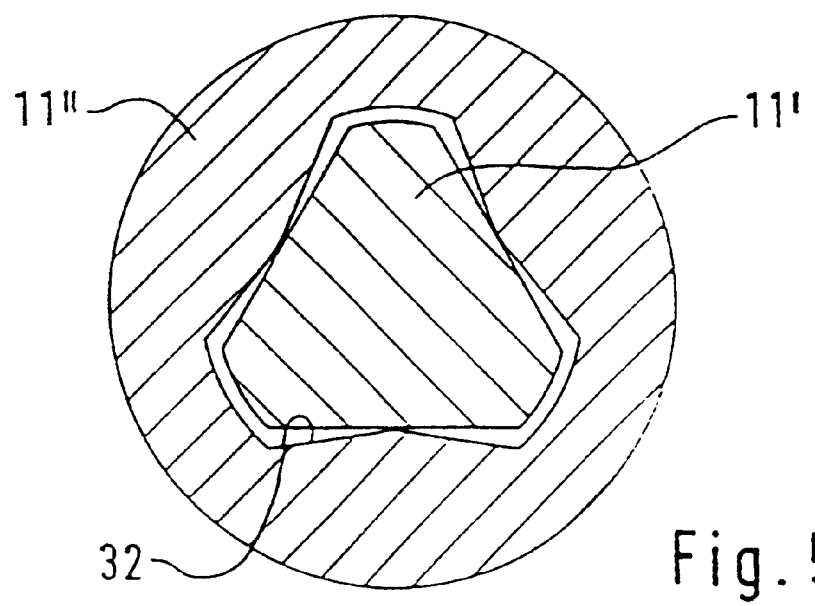
FIG. 5 is a sectional view along line V—V in FIG. 3.

Alternatively, it is also possible according to FIG. 5 that the end section of the shaft part 11' facing the shaft part 11" has an out-of-round cross-section and has, for example, a triangular cross-section. This out-of-round end section projects into an axial recess 32 having a non-round cross-section constructed in the shaft part 11". In the illustrated embodiment, the cross-section of the recess 32 is constructed as a three-point star such that the two shaft parts 11', 11" can be rotated relative to one another by a defined maximal angle.

Figure 6:
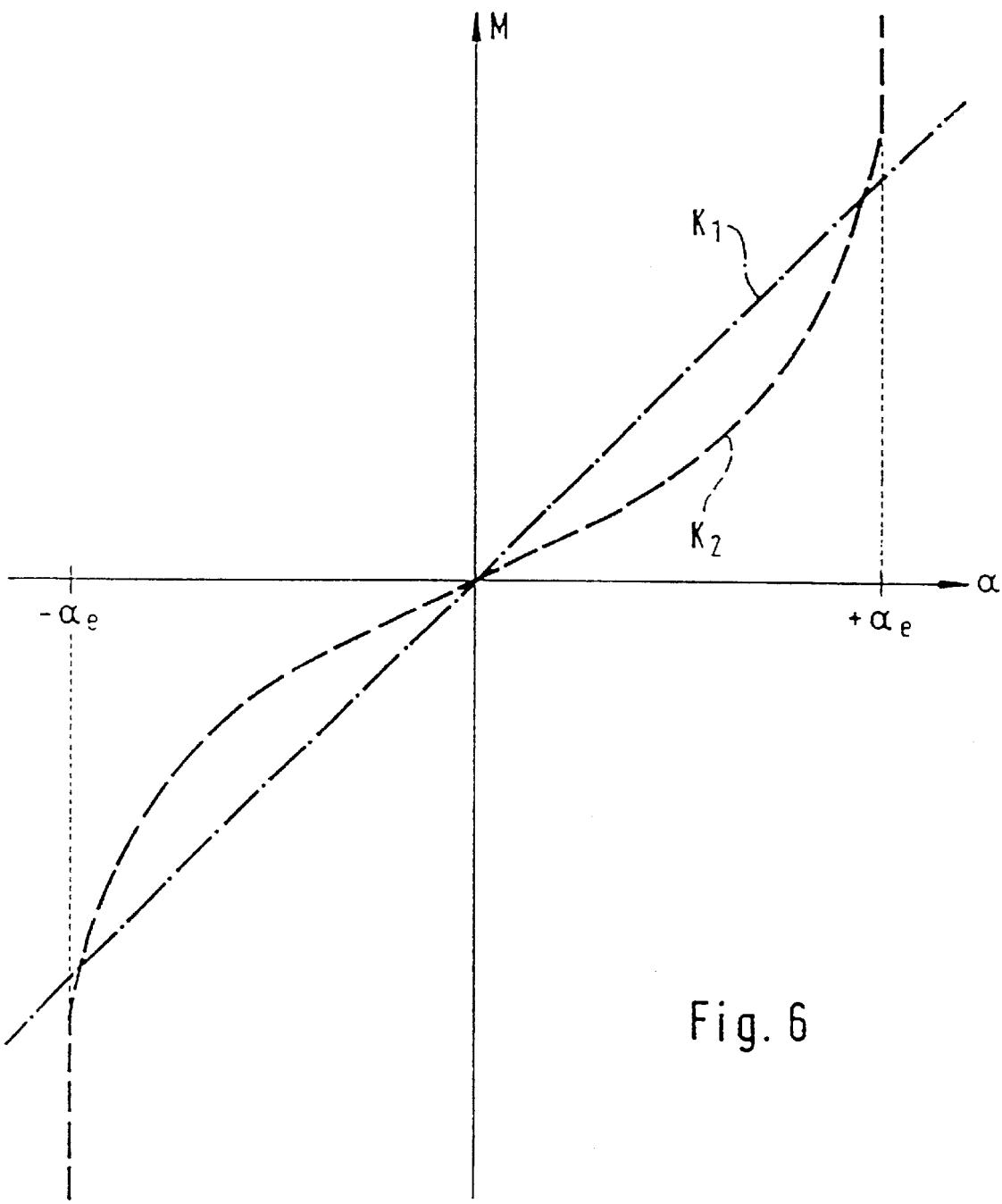
FIG. 6 is a diagram of the operating performance of the arrangements shown in FIGS. 2 and 3.

FIG. 6 is a diagram which illustrates the torque M effective between the shaft parts 11' and 11" as a function of the angle of rotation α, with the angle α having positive or negative values according to the relative rotating direction between the shaft parts 11', 11".

The essentially straight-line curve $K_1$ shows the relationships in an arrangement according to FIG. 2. During relative rotations between the shafts 11', 11", a torque occurs therebetween which changes approximately proportionally to the angle of rotation. This torque is generated by the torsion rod 24 for which a largely constant spring rate is typical.

The curve $K_2$ shows the relationships in the embodiment according to FIGS. 3 and 4. Here, the torque rises in the range of smaller angles of rotation between the shaft parts 11', 11" with respect to its amount at first only slowly with increasing angle values. That is, the spring constant of the C-spring 30 is relatively low in this angle range. When the amounts of the angles of rotation are larger, the torque will change very progressively. With angles of rotation $+\alpha_e$ and $-\alpha_e$, a further relative rotation between the shaft parts 11', 11" is limited by the ribs 31 acting as stops in FIG. 4.

In the embodiment of FIGS. 3 and 4, therefore, in the environment of a center position of the shaft parts 11', 11" relative to one another, the angle of rotation changes comparatively significantly in the case of simultaneously comparatively small changes of the torque between the mentioned shaft parts 11', 11". As the result of this spreading of the angle of rotation in the range of small torques, the existing manual force and the manual torque can be determined more precisely and thus the controlling of the adjusting force of the electric motor 12 can be facilitated when generating the manual force during the normal operation of the illustrated steering system.

In all the illustrated embodiments, the angle-of-rotation generator 22 assigned to the shaft part 11' can also take over the function of the desired value generator 10 for the steering angle so that this desired value generator 10 is not required as a separate part or can form a redundant arrangement with respect to the desired steering value angle with the mentioned angle-of-rotation generator 22.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle steering system, comprising a manual steering handle operable by a vehicle driver, an adjusting assembly operatively connected with steered vehicle wheels as part of a steering drive, the steering handle being operatively connected with the steered vehicle wheels via a controller arrangement having an input side connected to a desired value generator operatively associated with the steering handle for a steering angle to be set by the vehicle driver as well as to an actual value generator which records a steering angle of the steered vehicle wheels, an output of the controller arrangement being configured to control the adjusting assembly as a function of compared desired and actual values, a motor constituting a manual force adjuster operatively connected with the steering handle to simulate a steering resistance on the steering handle, wherein the steering handle and the motor are connected via a shaft to the steering drive, with the motor being arranged to be controlled as a function of the compared actual value signal and desired-value generator signal, the shaft has parts respectively connected with the motor and the steering handle rotatable relative to one another against an elastic resistance, whereby the actual value signal for a manual force is generatable from the extent and the direction of relative rotation between the shaft parts, and a mechanical through-drive is configured to become upon a malfunction of the controlling device and extends via the shaft, and is non-operative during a correct functioning of the controlling device, and the motor is configured to be controlled as a function of the extent and the direction of the relative rotation between the shaft parts.

2. Vehicle steering system according to claim 1, wherein respective angle-of-rotation sensors are assigned to the shaft parts to detect rotation of the assigned shaft part with respect to a relatively stationary part.

3. Vehicle steering system according to claim 2, wherein a mechanical through-drive is configured to become operative upon a malfunction of the controlling device and extends via the shaft, and is non-operative during a correct functioning of the controlling device, and the motor is configured to operate as an auxiliary motor which is controlled as a function of the extent and the direction of the relative rotation between the shaft parts.

4. Vehicle steering system according to claim 1, wherein the elastic resistance rises progressively with the shaft parts increasingly rotated from a central position relative to one another.

5. Vehicle steering system according to claim 4, wherein a mechanical through-drive is configured to become operative upon a malfunction of the controlling device and extends via the shaft, and is non-operative during a correct functioning of the controlling device, and the motor is configured to operate as an auxiliary motor which is controlled as a function of the extent and the direction of the relative rotation between the shaft parts.

6. Vehicle steering system according to claim 5, wherein respective angle-of-rotation sensors are assigned to the shaft parts to detect rotation of the assigned shaft part with respect to a relatively stationary part.

7. Vehicle steering system according to claim 1, wherein the shaft parts form end areas of a torsionally elastic shaft.

8. Vehicle steering system according to claim 7, wherein a mechanical through-drive is configured to become operative upon a malfunction of the controlling device and extends via the shaft, and is non-operative during a correct functioning of the controlling device, and the motor is configured to operate as an auxiliary motor which is controlled as a function of the extent and the direction of the relative rotation between the shaft parts.

9. Vehicle steering system according to claim 8, wherein respective angle-of-rotation sensors are assigned to the shaft parts to detect rotation of the assigned shaft part with respect to a relatively stationary part.

10. Vehicle steering system according to claim 9, wherein the elastic resistance rises progressively with the shaft parts increasingly rotated from a central position relative to one another.

11. Vehicle steering system according to claim 1, wherein a spring arrangement comprised of at least one of a torsion bar and a C-spring is arranged between the shaft parts.

12. Vehicle steering system according to claim 11, wherein a mechanical through-drive is configured to become operative upon a malfunction of the controlling device and extends via the shaft, and is non-operative during a correct functioning of the controlling device, and the motor is configured to operate as an auxiliary motor which is controlled as a function of the extent and the direction of the relative rotation between the shaft parts.

13. Vehicle steering system according to claim 12, wherein respective angle-of-rotation sensors are assigned to the shaft parts to detect rotation of the assigned shaft part with respect to a relatively stationary part.

14. Vehicle steering system according to claim 13, wherein the elastic resistance rises progressively with the shaft parts increasingly rotated from a central position relative to one another.

15. Vehicle steering system according to claim 1, wherein the motor comprises a non-self-locking electric motor.

16. Vehicle steering system according to claim 15, wherein a mechanical through-drive is configured to become operative upon a malfunction of the controlling device and extends via the shaft, and is non-operative during a correct functioning of the controlling device, and the motor is configured to operate as an auxiliary motor which is controlled as a function of the extent and the direction of the relative rotation between the shaft parts.

17. Vehicle steering system according to claim 16, wherein respective angle-of-rotation sensors are assigned to the shaft parts to detect rotation of the assigned shaft part with respect to a relatively stationary part.

18. Vehicle steering system according to claim 17, wherein the elastic resistance rises progressively with the shaft parts increasingly rotated from a central position relative to one another.

19. Vehicle steering system according to claim 18, wherein a spring arrangement comprised of at least one of a torsion bar and a C-spring is arranged between the shaft parts.

* * * * *